June 9, 1953 A. H. BRODBECK 2,641,679
FOOD CONDITIONER FOR COOKING RANGES
Filed Nov. 26, 1951 2 Sheets-Sheet 1
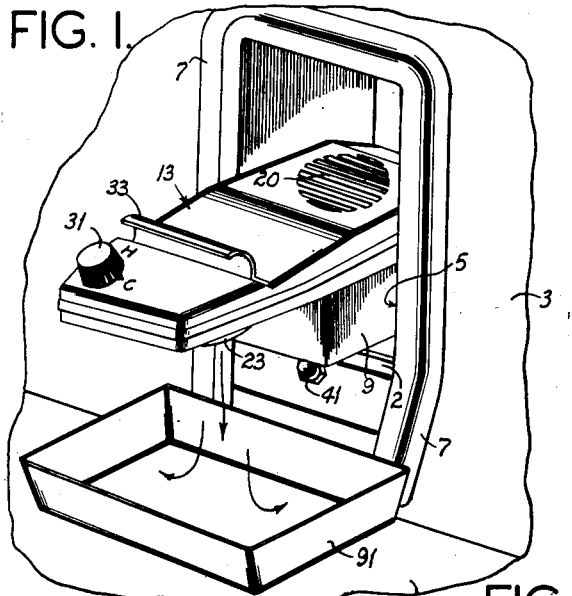
FIG. 1.
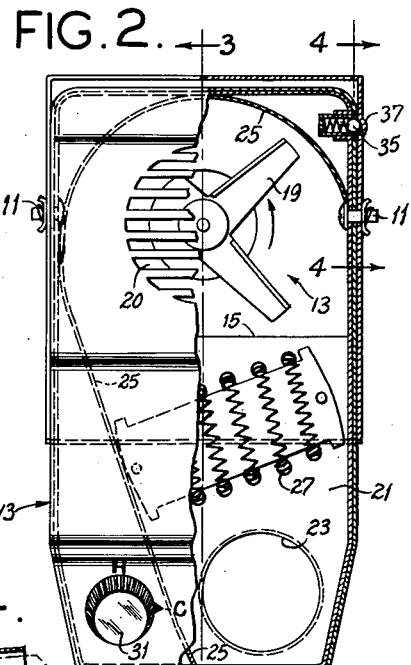
FIG. 2.
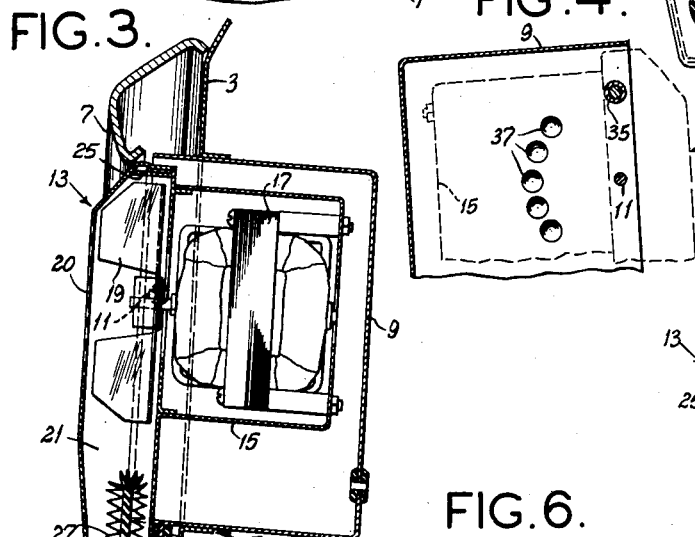
FIG. 3.
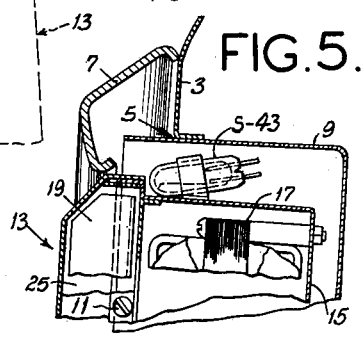
FIG. 4.
FIG. 5.
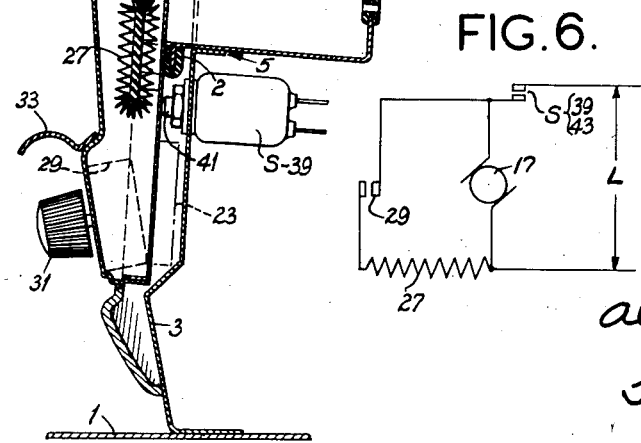
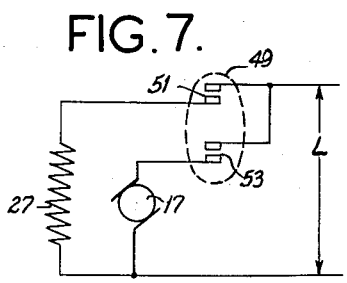
FIG. 6. FIG. 7.
Almer H. Brodbeck,
Inventor.
Koenig and Pope,
Attorneys.

June 9, 1953 A. H. BRODBECK 2,641,679
FOOD CONDITIONER FOR COOKING RANGES
Filed Nov. 26, 1951 2 Sheets-Sheet 2
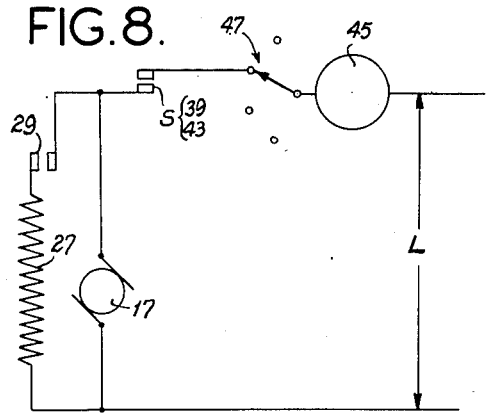
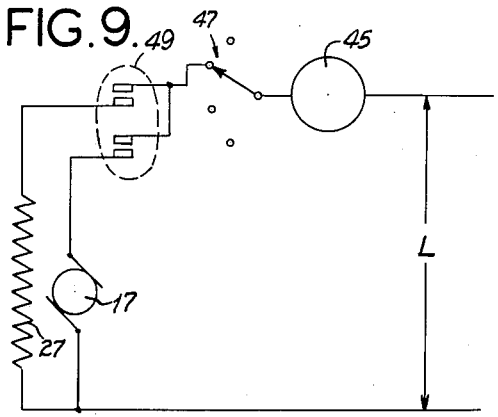
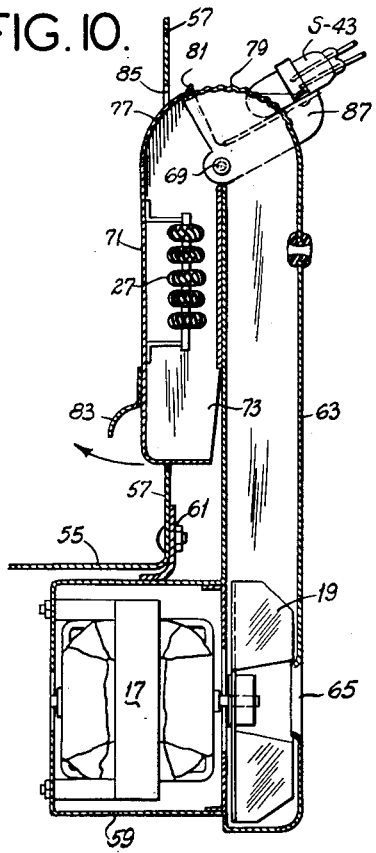
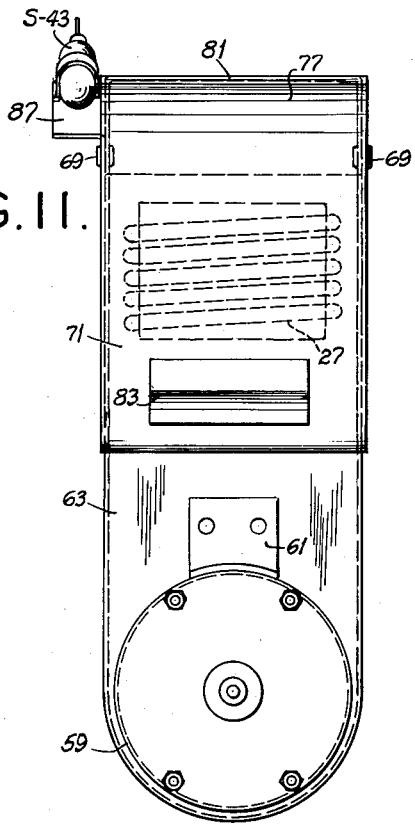
Almer H. Brodbeck,
Inventor.
Koenig and Pope
Attorneys.

Patented June 9, 1953

2,641,679

UNITED STATES PATENT OFFICE 2,641,679

FOOD CONDITIONER FOR COOKING RANGES

Almer H. Brodbeck, Webster Groves, Mo., assignor to Magic Chef, Inc., a corporation of New Jersey Application November 26, 1951, Serial No. 258,266

17 Claims. (Cl. 219—39)

This invention relates to food conditioners for cooking ranges.

Among the several objects of the invention may be noted the provision of a blower assembly on a cooking range for circulating air over food which will be or has been processed on the range; the provision of a blower assembly of the class described movably mounted upon a part of a range such as one of its panels, so that it may assume an impanel or retracted position when not in use and an extended operating position when in use; the provision of heating means, and of controls for the blower and the heating means, whereby the device may be conveniently prepared either quickly to defrost frozen foods and the like, preparatory to heat-processing them on or in the range, or prepared to cool articles that have been so heat-processed; and the provision of a device of the class described which may be organized with a selector switch and timing clock such as used on ranges to time its food-conditioning operations. Other objects will be in part apparent and in part pointed out hereinafter.

The invention accordingly comprises the elements and combinations of elements, features of construction, and arrangement of parts which will be exemplified in the structures hereinafter described, and the scope of which will be indicated in the following claims.

In the accompanying drawings, in which several of various possible embodiments of the invention are illustrated, Fig. 1 is an isometric view of one form of the invention shown in an extended operating position;

Fig. 2 is a plan view of a pivoted blower unit removed from a stove, parts being broken away;

Fig. 3 is a longitudinal section taken on line 3—3 of Fig. 2;

Fig. 4 is a vertical section taken on line 4—4 of Fig. 2, illustrating a detent holding mechanism;

Fig. 5 is a fragmentary view showing an alternative arrangement of automatic starting switch;

Figs. 6, 7, 8 and 9 are wiring diagrams illustrating various circuits useful in constructing the invention;

Fig. 10 is a vertical section showing an alternative form of the invention; and

Fig. 11 is a left-side elevation of Fig. 10, except that a supporting panel is omitted.

Similar reference characters indicate corresponding parts throughout the several views of the drawings.

It is very inconvenient and time consuming properly to condition (thaw) frozen foods for subsequent cooking or otherwise heating them in or on a range, and they must be so conditioned; otherwise the resulting range-heating process may produce an unsatisfactory result on the food. The slowness of thawing and variation of time for accomplishing it are a source of much annoyance. Moreover, the cooling of food such as pies, cakes and the like for immediate use after preparation in or on the range also presents a problem. Briefly, the present invention provides for a built-in blower unit on the range, and more particularly one which is movably mounted, preferably in an opening on the back panel of the range. It is normally in a retracted or impanel position covering the opening but may be drawn into an extended operating position for controllably projecting downward a blast of warm or cool air, upon either a cold or hot object in a container resting upon the top of the range. The controls are arranged for maximum convenience in starting and stopping whatever type (warm or cool) blast is selected.

Referring now more particularly to Fig. 1, there is shown at numeral 1 the top or horizontal working surface of a cooking range having a back control panel 3 in which is an opening 5 surrounded by trim 7. Within the opening 5 is mounted a fixed container box 9 having pivots 11 for a blower unit 13. This unit is constituted by a boxing portion 15 in which is a motor 17 for driving a centrifugal fan 19. The fan is located in a duct 21 attached to the motor box 15. The duct has an air inlet grill 20, an air outlet nozzle 23 and an interior volute baffle 25 for directing air from the inlet, through the fan to the outlet. Within the volute of the baffle is mounted a heating coil 27. Outside the baffle 25 but within the duct 21 is a control switch 29 adapted to be operated by an outside knob 31. The baffle 25 protects the switch 29 from heated air which flows through the duct 21 to the nozzle 23. A lift handle 33 is provided for swinging the assembly 15, 21 on the pivots 11 from the impaneled position such as shown in Fig. 3, to the extended position shown in Fig. 1. A rubber bumper 2 on a lower edge of the box 9 is engageable by the blower unit 13 when the latter is impaneled. When impaneled it covers the opening 5. The side of the unit opposite the motor boxing portion 15 is sufficiently flat to complement the generally flat appearance of the panel 3 when the unit is in closed or retracted position (see Fig. 3).

In order to hold the duct 21 in predetermined extended positions there is provided on it a spring-pressed ball-detent 35, the ball of which cooperates with an arcuate line of depressions 37 arranged in the panel box 9. It will be understood that the detent mechanism 35, 37 permits the blower unit 13 to be swung from the impaneled position to any of various extending positions, the preferable extended position being the horizontal one shown in Fig. 1. Thus air issuing from the opening 23 is directed downward. It is to be noted that the duct portion 21 of the blower unit is provided with a substantially flat face portion covering the opening 5 in the panel 3 when the blower unit is in retracted position. Thus the panel 3 presents a minimum of protruding parts when the device is out of use.

At S–39 in Fig. 3, is shown a starting switch mounted on the back panel 3. This switch has a push button 41 engageable by the duct 21 when the latter is in impaneled position. Engagement opens the switch; otherwise, when the nozzle is extended, the switch is closed. As will appear, the switch is connected into a circuit which starts the motor 17 when the nozzle is extended (switch closed). Instead of the switch S–39 for this purpose as shown in Fig. 3, a mercury switch S–43 may be mounted upon the box 15, as shown in Fig. 5. This switch is so positioned that its mercury closes its contacts, except in about the impaneled position of the duct 21.

In Fig. 6 is shown one form of circuit that may be used for carrying out the invention. In this case the switch S–39 or S–43 (whichever is employed) controls current flowing to the motor 17 and the heater resistance 27 which are connected in parallel across the line L. Thus whenever the blower unit 13 is lifted, the motor 17 starts and the unit 27 heats; provided the switch 29 is set to heating position indicated by H on Figs. 1 and 2. If the switch 29 is opened (set at C), the blower operates to blow cold without a heating effect.

In Fig. 7 the motor 17 and heater resistance 27 are again in parallel across the supply line L. In this case a three-position switch 49 is employed, having sets of contacts 51 and 53 controlling the heater 27 and motor 17, respectively. When this switch 49 is in one position, all contacts are open. In a second position the motor contacts 53 only are closed and in a third position both the motor contacts 53 and the heater contacts 51 are closed. It is to be understood that with this Fig. 7 wiring none of the switches S–39, S–43 or 29 is used. The switch 49 may be placed anywhere on the range or substituted in position where the switch 29 now is shown on the blower unit 13.

Fig. 8 is a wiring diagram similar to Fig. 6, in which the switch S–39 (or switch S–43) is supplied with current from the line L through an electric timing clock 45 and a selector switch 47. The time clock is of the variety ordinarily used on ranges for timing the current supply. For example, such clocks will supply current for a desired interval starting immediately, or for a desired interval to start at some future time. The purpose of the selector switch 47 is to direct the timed current supplied through the timing clock to desired operating coils on the stove. For this purpose, such selector switches have various contacts, as shown, supplying various items such as top heaters, the oven or the like. In the present case, one of the terminals of the selector switch will supply the heating coil 27 and motor 17. Thus this Fig. 8 construction operates like that of Fig. 6, except that current supply is subjected to the control of the clock 45 and the selector switch 47.

In Fig. 9 is shown a wiring diagram similar to that shown in Fig. 7, except that the current supply from the line L to the three-position switch 49 occurs via clock 45 and selector switch 47. The operation of the Fig. 9 construction will be clear from what has been stated with respect to the functions of clock 45 and switches 47 and 49.

Summarizing then, Figs. 6 and 8 show constructions in which the motor is automatically started upon lifting the blower unit 13, and the heater coil 27 is either energized or prepared to be energized, depending upon the setting of the knob 31. According to Figs. 7 and 9, the action of motor 17 and of the heating coil 27 is independent of the lifting action on the blower unit 13, both motor and heating unit control being effected by the manually operated three-position switch 49.

In both the Fig. 8 and Fig. 9 constructions, the entire system is under control of the time clock 45 and the electric switch 47.

Referring to Fig. 10, there is shown another form of the mechanical parts of the invention, in which the top of the range is shown at 55 and the back panel at 57. In this case the motor housing 59 is stationary, being attached to the range parts at 61. The blower unit in this instance is constituted by a stationary duct 63 behind the panel 57, in which is an inlet 65 and the fan 19 driven by the motor 17. Pivoted at 69 to the upper end of the duct 63 is a swinging duct 71 having an outlet 73 and containing the heating coil 27. A curved portion 77 of duct 71 telescopes with a curved portion 79 of duct 63. A lug 81 on part 77 engages serrations (as shown) on the part 79, so that the duct 71 may maintain any desired angular (preferably normal) position when pulled up by means of handle 83. An opening 85 in the panel 57 accommodates the desired movement from the impaneled position shown in Fig. 10 to an extended (including horizontal) position not shown. The opening is closed when duct 71 is down. An arm 87, associated with part 77, carries mercury switch S–43 which closes when the duct 71 is extended. Circuits such as shown in Figs. 7–9 are applicable to the modification of Figs. 10 and 11 provided where necessary that switches such as 29 or 49 are employed.

In Fig. 1 is suggested how a tray 91 may be placed under the blower unit of the invention when the latter is extended to a normal position. This tray may contain frozen food to be defrosted, in which event the heater element is energized so that warm air is blown down; or it may contain hot foods such as a baked pie, in which event the heater element is deenergized so that relatively cool air is blown down.

It will be understood that although the invention is shown as being carried out with a blower unit that swings in a vertical plane, this unit could be caused to swing in other planes from its impaneled to its extended or normal position. It will also be understood that the device may be used not only for heating and cooling operations, but any operations that require circulation of air over articles used in and about a range, for example, dehydration.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A food conditioner for a cooking range comprising a blower unit constituted by a motor-driven fan, and a duct leading from the fan, at least a portion of said duct being pivoted with respect to the range and movable from a retracted position with respect to a part of the range to an extended position, said movable portion of the duct having an air outlet.

2. A food conditioner for a cooking range comprising a blower unit constituted by a motor-driven fan, and a duct leading from the fan, at least a portion of said duct being pivoted on a horizontal axis with respect to the back panel of the range and movable from a retracted position with respect to said back panel to an extended position, the lower end as retracted of said movable portion of the duct having an air outlet which is arranged for downward projection of air when said portion is extended.

3. A food conditioner for a cooking range made according to claim 1, including an electric circuit and a switch responsive to duct movement toward extended position to energize the motor.

4. A food conditioner for a cooking range comprising a blower unit constituted by a motor-driven fan, and a duct leading from the fan, at least a portion of said duct being movable from a retracted position covering an opening in the range to an extended position, said movable portion of the duct having an air outlet which is downwardly directed when the duct is extended.

5. A food conditioner for a cooking range made according to claim 4, including an electric switch responsive to duct movement to energize the motor.

6. A food conditioner for a cooking range made according to claim 4, wherein said movable portion of the duct includes a heating element for warming air passing to said outlet from the fan.

7. A food conditioner for a cooking range made according to claim 5, wherein said movable portion of the duct includes a heating element for warming air passing to said outlet from the fan, and wherein is included a manual switch for said heating element.

8. A food conditioner for a cooking range made according to claim 7, wherein said manual switch is carried upon and movable with the movable portion of the duct.

9. A food conditioner for a cooking range comprising a motor-driven blower unit pivoted in an opening on the back of the range, said unit having a duct adapted to close the opening in a position substantially in the plane of said back and having an outlet and being adapted to extend from said opening substantially normal to the back, the extending portion of said duct having an opening which is downwardly directed when the duct is extended.

10. A food conditioner for a cooking range made according to claim 9, including an electric circuit and a switch responsive to normal positioning of the duct to energize the motor.

11. A food conditioner for a cooking range made according to claim 10, wherein an electric heating element is carried in the duct and a switch for said heating element is carried on the duct.

12. A food conditioner for a cooking range comprising a motor-driven blower unit incorporating a duct having a rigid portion attached to the range adjacent an opening in its back, a pivoted duct extension on said rigid portion adapted to form a substantial closure for said opening in one position and to move into an extended position substantially normal to said back, said extension having an air outlet which is directed downward in extended position of the extension.

13. A food conditioner for a cooking range made according to claim 12, including a switch responsive to movement of the pivoted duct to normal position to energize the motor-driven blower.

14. A food conditioner for a cooking range made according to claim 13, wherein said pivoted duct includes an electric heating element.

15. A food conditioner for a cooking range having a substantially horizontal working surface and an upwardly extending back panel adjacent to said working surface; comprising a blower unit constituted by a fan, a motor for driving the fan, a duct adapted to be supplied with air by the fan; means articulating said unit on the back panel for movement from a retracted to an extended position of said duct relative to the panel, said duct having an air outlet which is substantially downwardly directed when the duct is extended for blowing air down on articles located on the working surface and below the outlet, and a heating element for warming air passing from the outlet.

16. A food conditioner for a cooking range having a substantially horizontal working surface and an upwardly extending back panel adjacent said working surface; said back panel having an opening, pivot means adjacent the opening, an enclosed blower unit swingable on said pivot means from a retracted position in the opening to an extended position, said blower unit containing a motor-driven fan, a duct extending from said fan, said duct having an outlet and a heater in the duct between the motor and the outlet, said outlet being arranged for projection of air substantially downward toward said working surface when the blower unit is in extended position, the unit having a face portion adapted to cover the opening when the blower unit is in retracted position.

17. A food conditioner for a cooking range having a substantially horizontal working surface and an upwardly extending rear panel adjacent said working surface, said panel being essentially flat and having an opening therein; comprising a fixed container box having an open front, means for connecting the open front of said box with said panel opening, said box extending rearward from the opening, an enclosed movable blower unit, a fan, a motor for driving the fan, said unit being shaped to include a motor boxing portion and having a duct extending from the fan, said duct having an outlet and a heater, pivot means between said fixed box and said movable blower unit arranged so that the blower unit may swing from a first retracted position wherein said motor boxing portion is contained within the fixed container box, to a second extended position wherein air is projected substantially downward toward said working surface when the fan is operating, the unit having a sufficiently flat face portion on its side opposite said motor boxing portion to complement the substantially flat panel when the unit is in retracted position and to cover said opening.

ALMER H. BRODBECK.

References Cited in the file of this patent

UNITED STATES PATENTS

| Number | Name | Date |
|---|---|---|
| 2,221,647 | Mooney | Nov. 12, 1940 |
| 2,470,181 | McIntyre | May 17, 1949 |
| 2,487,855 | Cranston, Jr. | Nov. 15, 1949 |